United States Patent
Gong et al.

(10) Patent No.: US 9,170,098 B2
(45) Date of Patent: Oct. 27, 2015

(54) DEVICE AND METHOD USING A SPATIAL LIGHT MODULATOR TO FIND 3D COORDINATES OF AN OBJECT

(75) Inventors: Yu Gong, Orlando, FL (US); Ryan Kruse, Waltham, MA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 13/544,078

(22) Filed: Jul. 9, 2012

(65) Prior Publication Data
US 2013/0016362 A1 Jan. 17, 2013

Related U.S. Application Data

(60) Provisional application No. 61/507,304, filed on Jul. 13, 2011.

(51) Int. Cl.
G01B 11/30 (2006.01)
G01B 11/24 (2006.01)
G01B 11/25 (2006.01)
G01B 11/00 (2006.01)

(52) U.S. Cl.
CPC .......... *G01B 11/2527* (2013.01); *G01B 11/002* (2013.01); *G01B 11/24* (2013.01)

(58) Field of Classification Search
CPC .............................. G01B 11/002; G01B 11/24
USPC .................................................. 356/600–624
See application file for complete search history.

(56) References Cited

U.S. PATENT DOCUMENTS 3,762,809 A 10/1973 Kato et al.
4,017,727 A 4/1977 Yamamoto 5,166,508 A * 11/1992 Davis ................. G02B 26/0825
  250/201.9
5,870,191 A 2/1999 Shirley et al.
6,040,910 A 3/2000 Wu et al.

(Continued)

FOREIGN PATENT DOCUMENTS

DE  10321888 A1  12/2004
EP   1944569 A1   7/2008

(Continued)

OTHER PUBLICATIONS

International Search Report of the International Searching Authority for Application No. PCT/US2012/045361; Date of Mailing Oct. 22, 2012.

(Continued)

*Primary Examiner* — Gregory J Toatley
*Assistant Examiner* — Hina F Ayub
(74) *Attorney, Agent, or Firm* — Cantor Colburn LLP (57) ABSTRACT

A method for determining three-dimensional coordinates of an object point on a surface of an object, the method including steps of: providing a source, a projector, and a camera; in each of two instances: spatially modulating source light; sending a modulator pattern of light through the projector lens to form light spots; filtering the spots with a pinhole plate; propagating light from the light spots onto the object to produce a fringe pattern; imaging the object point with a camera lens onto an array point of the photosensitive array to obtain first and second electrical data values from the photosensitive array; and determining the three-dimensional coordinates of the first object point based at least in part on the first electrical data value, the second electrical data value, and a baseline length.

11 Claims, 4 Drawing Sheets

(56) References Cited

U.S. PATENT DOCUMENTS

| | | | |
|---|---|---|---|
| 6,438,272 B1* | 8/2002 | Huang et al. | 382/286 |
| 6,549,730 B1* | 4/2003 | Hamada | 396/111 |
| 6,690,474 B1 | 2/2004 | Shirley | |
| 6,768,589 B2 | 7/2004 | Deutsch et al. | |
| 6,909,105 B1* | 6/2005 | Heintzmann et al. | 250/559.04 |
| 6,985,308 B1 | 1/2006 | Smith et al. | |
| 7,046,410 B2 | 5/2006 | Deutsch et al. | |
| 7,139,128 B2 | 11/2006 | Smith et al. | |
| 7,196,789 B2 | 3/2007 | Senturia et al. | |
| 7,379,241 B2 | 5/2008 | Smith | |
| 7,505,641 B1 | 3/2009 | Senturia et al. | |
| 7,595,892 B2 | 9/2009 | Judell et al. | |
| 7,751,063 B2 | 7/2010 | Dillon et al. | |
| 7,763,841 B1 | 7/2010 | McEldowney | |
| 7,791,027 B2 | 9/2010 | McAllister et al. | |
| 2002/0163573 A1 | 11/2002 | Bieman et al. | |
| 2003/0052607 A1* | 3/2003 | Paquette | 313/631 |
| 2003/0058455 A1* | 3/2003 | Ebihara et al. | 356/601 |
| 2003/0072011 A1 | 4/2003 | Shirley | |
| 2004/0081441 A1 | 4/2004 | Sato et al. | |
| 2004/0125205 A1 | 7/2004 | Geng | |
| 2005/0002677 A1 | 1/2005 | McAllister et al. | |
| 2008/0180693 A1* | 7/2008 | Dillon et al. | 356/521 |
| 2009/0257063 A1 | 10/2009 | Smith et al. | |
| 2010/0008588 A1* | 1/2010 | Feldkhun et al. | 382/206 |
| 2010/0182311 A1 | 7/2010 | Kim | |
| 2010/0290060 A1 | 11/2010 | Mohazzab et al. | |
| 2011/0043876 A1* | 2/2011 | Kurashige et al. | 359/15 |
| 2012/0262550 A1 | 10/2012 | Bridges | |
| 2012/0262573 A1 | 10/2012 | Bridges | |

FOREIGN PATENT DOCUMENTS

| | | |
|---|---|---|
| EP | 2157455 A1 | 2/2010 |
| JP | 2001127852 A | 5/2001 |
| JP | 2002013919 A | 1/2002 |
| JP | 2002090126 A | 3/2002 |
| JP | 2006258438 A | 9/2006 |
| WO | 2006107929 A1 | 10/2006 |
| WO | 2010021972 A1 | 2/2010 |
| WO | 2010096062 A1 | 8/2010 |
| WO | 2010096634 A1 | 8/2010 |

OTHER PUBLICATIONS

International Search Report of the International Searching Authority for Application No. PCT/US2012/045908; Date of Mailing Oct. 8, 2012.

International Search Report of the International Searching Authority for Application No. PCT/US2012/045909; Date of Mailing Oct. 8, 2012.

Swanson, G., et al., High-Precision Surface Profiling with Broadband Accordion Fringe Interferometry, Proceedings of SPIE, vol. 4189, Feb. 12, 2001; pp. 161-169, XP55038933, ISSN: 0277-786X, DOI: 10.1117/12.417193 the whole document.

Written Opinion of the International Searching Authority for Application No. PCT/US2012/045909; Date of Mailing Oct. 8, 2012.

Written Opinion of the International Searching Authority for Application No. PCT/US2012/045361; Date of Mailing Oct. 22, 2012.

Written Opinion of the International Searching Authority for Application No. PCT/US2012/045908; Date of Mailing Oct. 8, 2012.

Hornbeck, L.J., Digital Light Processing for High-Brightness, High-Resolution Applications, Texas Instruments Inc., Digital Video Operations, Dallas, Texas, Electronic Imaging, EI '97 Projection Displays III, Co-Sponsored by IS&T and SPIE, An Invited Paper, Feb. 10-12, 1997, San Jose, California.

Hornbeck, L.J., Digital Light Processing and MEMS: Timely Convergence for a Bright Future, Plenary Session, SPIE Micromachining and Microfabrication '95, Austin, Texas (Oct. 24, 1995). Color reprint available from Texas Instruments Digital Imaging Group, 214-995-2426.

Frankowski, G., DLP-Based 3D Metrology by Structured Light or Projected Fringe Technology for Life Sciences and Industrial Metrology, GFMesstechnik GmbH, Germany, Proc. SPIE Photonics West 2009.

VLSI Membrane Mirror Light Modulator for Multi-spectral Scene Projectors, Optron Systems, Inc., Public Release No. AFFTC PA 08430, http://www.optronsystems.com/html/technology_mems.htm. [Retrieved Jul. 12, 2012].

Frankowski, G., et al., Real-time 3D Shape Measurement with Digital Stripe Projection by Texas Instruments Micromirror Devices DMD, GFMesstechnik GmbH, Warthestr. 21, D-14513 Teltow/Berlin, Proc. of SPIE—vol. 2958 (2000), pp. 90-106.

Rusinkiewicz, Szymon, et al., Real-Time 3D Model Acquisition, ACM Transactions on Graphics, (Proc. SIGGRAPH), Jul. 2002, http://gfx.cs.princeton.edu/pubs/Rusinkiewicz_2002_R3M/index.php, [Retrieved Jul. 11, 2012].

Texas Instruments, Using Lasers with DLP DMD Technology, Lasers & DLP, TI DN 2509927, Copyright Sep. 2008, Texas Instruments Incorporated.

Georgia Tech. (Apr. 11, 2011). Trimensional 3D Scanner iPhone app. [Video file]. Retrieved from https://www.youtube.com/watch?v=a3IQcF2jO8k.

Geng, Jason. "Structured-Light 3D Surface Imaging: A Tutorial", Advances in Optics and Photonics, vol. 3, No. 2, Mar. 31, 2011, p. 128, XP55033088, DOI: 10.1364/A0P.3.000128, the whole document.

International Preliminary Report on Patentability for International Application Serial No. PCT/US2012/035931. International filing date May 1, 2012. Date of Issuance Nov. 5, 2013.

International Preliminary Report on Patentability for International Application Serial No. PCT/US2012/045361. International filing date Jul. 14, 2011. Date of Issuance Jan. 14, 2014.

International Preliminary Report on Patentability for International Application Serial No. PCT/US2012/045908. International filing date Jul. 9, 2012. Date of Issuance Jan. 14, 2014.

International Preliminary Report on Patentability for International Application Serial No. PCT/US2012/045909. International filing date Jul. 9, 2012. Date of Issuance Jan. 14, 2014.

International Search Report of the International Searching Authority for Application No. PCT/US2012/035931; Date of Mailing Jul. 26, 2012.

Written Opinion of the International Searching Authority for Application No. PCT/US2012/035931; Date of Mailing Jul. 26, 2012.

* cited by examiner

FIG. 3A
PITCH 1

FIG. 3B
PITCH 2

FIG. 3C
PITCH 3

DEVICE AND METHOD USING A SPATIAL LIGHT MODULATOR TO FIND 3D COORDINATES OF AN OBJECT

CROSS-REFERENCE TO RELATED APPLICATIONS

The present application claims the benefit of U.S. Provisional Patent Application No. 61/507,304, filed on Jul. 13, 2011, the contents of which are hereby incorporated by reference in their entirety.

BACKGROUND

The present disclosure relates in general to three-dimensional (3D) surface contouring techniques, and more particularly to a device and method for using a spatial light modulator as a dynamic diffraction grating to reflect structured light in one of many types of patterns onto a surface of an object to ultimately determine through triangulation the 3D contour of the object's surface using the interference of two beams or spots of light.

In the field of three-dimensional surface contouring for accurately and rapidly determining the 3D coordinates of an object, there are many known techniques available, some of which involve the use of projecting various structured light patterns onto the object. The structured light pattern is typically formed in fringes (i.e., alternating bright and dark or different colored "stripes" or regions) on a surface of the object. In some cases, a spatial light modulator in the form of a diffraction grating of either a transmissive or reflective type is used to form grating patterns and to vary the phase of these patterns. The resulting fringe patterns on the surface of the object are then viewed by a camera device such as a charge coupled device (CCD), and processed by a computer or processor using various known triangulation techniques to ultimately determine the 3D surface contour of the object.

However, drawbacks with this type of approach include the fact that the diffraction grating is of a "static" type which must be moved by some type of manual means to effectuate a shift in the phase of the grating patterns. This results in a relatively slow phase shifting speed, which leads to less than optimum performance of the overall system. Also, such a system may require multiple separate diffraction gratings, each having a different grating period, to create a fringe pattern having the required spacing between the fringe lines (also known as pitch of the fringe lines). Besides the multiple gratings, it may also be necessary to provide associated translation stages and optical component feedback mechanisms, both of which are generally relatively expensive. Such a system may also require a relatively large amount of processor capability to process the camera captured images.

Other known prior art 3D object surface contouring systems are based on the direct projection of laser light, the projected image being essentially a replica of a pattern formed in a spatial light modulator such as, for example, in a digital micromirror device.

It is desirable to create very pure sinusoidal patterns having an infinite depth of field. A way to do this is to use a reflective or transmissive device as a dynamic diffraction grating device in a relatively highly accurate and less expensive 3D object surface contouring measurement system to form various types of structured light patterns by reflection of light off of the grating which then provides the reflected light through a pinhole plate to create by filtering two focused spots of light corresponding to the +1 and −1 order modes, and then allowing the light from the two spots of light to interfere at the surface of an object. The interference creates periodic sine waves that vary in intensity, thereby representing fringe patterns whose images may then be captured by a camera device and processed using known triangulation techniques to determine the 3D surface contour of the object. The reflective dynamic diffraction grating may comprise a digital micromirror device (DMD) comprised of a two-dimensional array of a plurality of movable reflective light switches or mirrors formed using microelectromechanical systems (MEMS) technology. The dynamic diffraction grating may be referred to in general as a spatial light modulator (SLM) of which the grating may be a particular type of SLM.

SUMMARY OF THE INVENTION

A method for determining three-dimensional coordinates of a first object point on a surface of an object includes the steps of: providing a source, a projector, and a camera, the projector including a spatial light modulator, a projector lens, and a pinhole plate, the camera including a camera lens and a photosensitive array, the projector having a projector perspective center, the camera having a camera perspective center, the line segment connecting the projector perspective center and the camera perspective center being the baseline, the length of the baseline being the baseline length; projecting a first light from the source to the spatial light modulator. The method also includes, in a first instance: spatially modulating the first light with the spatial light modulator to produce a first modulator pattern of light having a first pitch; sending the first modulator pattern of light through the projector lens to form a first plurality of light spots; filtering the first plurality of spots with the pinhole plate to pass a first pair of light spots while blocking other spots from among the first plurality of spots; propagating light from the first pair of light spots onto the object to obtain a first fringe pattern on the object, the first object point being illuminated by the first fringe pattern; imaging the first object point with the camera lens onto a first array point of the photosensitive array to obtain a first electrical data value from the photosensitive array. The method further includes, in a second instance: spatially modulating the first light with the spatial light modulator to produce a second modulator pattern of light having a pitch equal to the first pitch, wherein the second modulator pattern is spatially shifted relative to the first modulator pattern; sending the second modulator pattern of light through the projector lens to form a second plurality of light spots; filtering the second plurality of spots with the pinhole plate to pass a second pair of light spots while blocking other spots from among the second plurality of spots; propagating light from the second pair of light spots onto the object to obtain a second fringe pattern on the object, the first object point being illuminated by the second fringe pattern; imaging the first object point with the camera lens onto a first array point of the photosensitive array to obtain a second electrical data value from the photosensitive array. The method still further includes: determining the three-dimensional coordinates of the first object point based at least in part on the first electrical data value, the second electrical data value, and the baseline length; and storing the three-dimensional coordinates of the first object point.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 3, including FIG. 4, including

DETAILED DESCRIPTION

Figure 1:
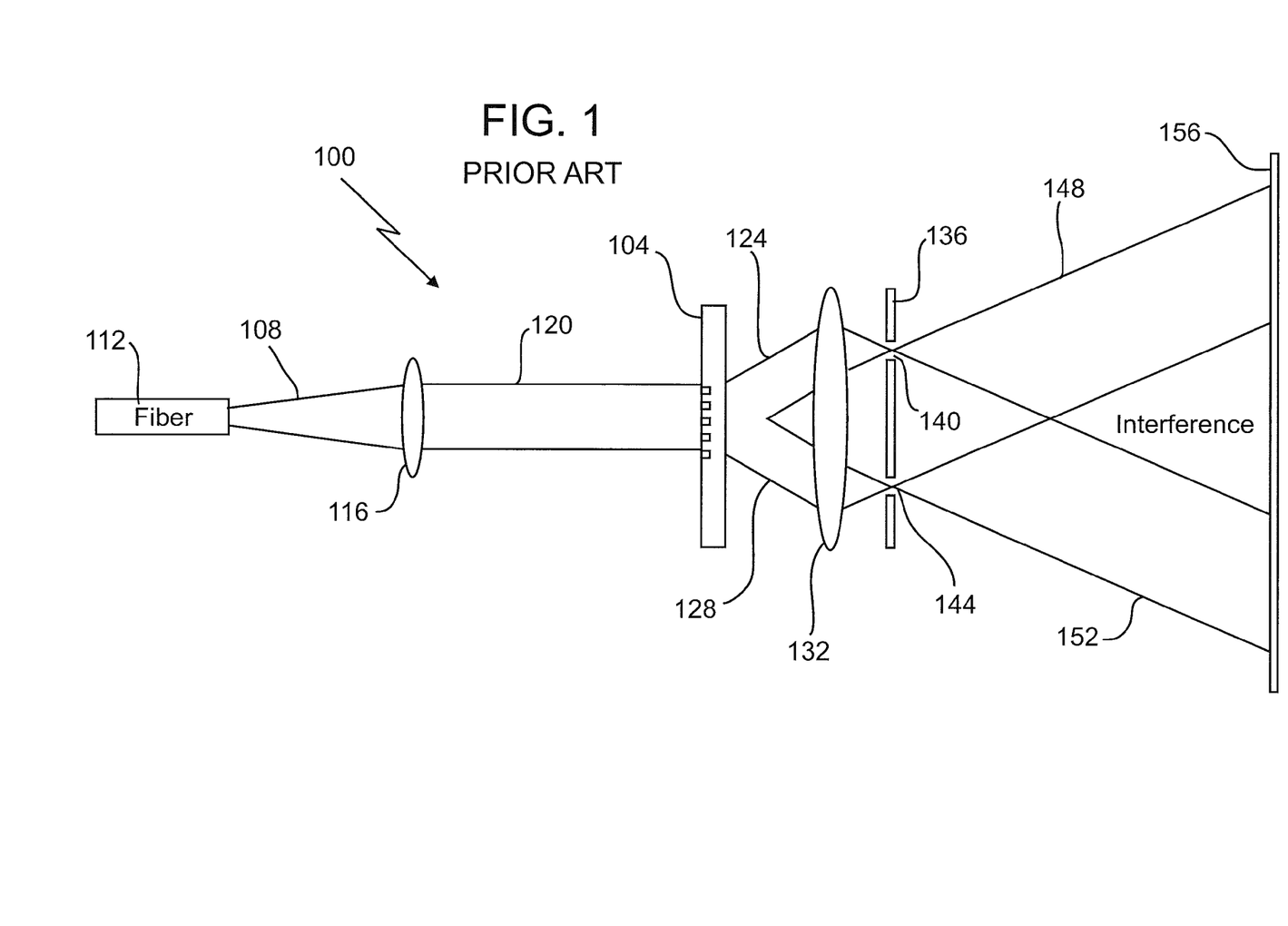
FIG. 1 illustrates a portion of a known, prior art system for determining the 3D surface contour of an object using a static transmissive diffraction grating which may be moved by manual means and though which the resulting structured light passes in one of various types of grating patterns and then through a pinhole plate to pass two focused spots of light arising from plane waves corresponding to the +1 and −1 order modes of the particular grating pattern utilized, the two spots of light then interfering at the surface of the object, the interference creating a sinusoidally varying irradiance over the object surface. The fringe pattern on the object surface may be captured by a camera device and processed using triangulation techniques to determine the 3D surface contour of the object.

Referring to FIG. 1, there illustrated is a portion of a known, prior art system 100 for determining the 3D surface contour of an object using a static transmissive 2D diffraction grating 104. A beam of light 108 provided from a light source (e.g., a laser—not shown) passes through an optical fiber 112. The light beam 108 then passes through a collimating lens 116 that collimates the light beam 108 and passes the collimated light beam 120 to the diffraction grating 104. The grating 104 is typically static by nature and may be moved (e.g., back and forth) by any number of means (not shown), such as a motor. The grating forms the light beam 120 into one of various types of grating patterns of structured light. Movement of the static transmissive diffraction grating 104 causes a shift in the phases of the grating patterns. The system 100 of FIG. 1 may operate according to the known accordion fringe interferometry (AFI) technique.

More specifically, in the prior art embodiment of FIG. 1, an AFI projector light source (e.g., the diode laser—not shown) may be coupled to the single mode optical fiber 112. Light emitted from the end of the fiber 112 is collimated by the lens 116 and projected onto the phase diffraction grating 104. The light transmissive grating 104 splits the collimated beam 108 into two light beams 124, 128. Both light beams 124, 128 then enter an objective lens 132 that focuses the two light beams 124, 128 onto the same focal plane. A pinhole plate 136 has two pinholes 140, 144 formed therein. The pinhole plate 136 rejects all but the spots produced by the +1 and −1 diffraction orders and projects the resulting light 148, 152 onto a surface 156 of the object. The interference of the +1 and −1 light 148, 152 creates a sinusoidal pattern on the surface 156 of the object.

The diffraction grating 104 may comprise a series of lines etched into a piece of glass. In an embodiment, the etch depth is $d=\lambda/2(n-1)$, where $\lambda$ is the wavelength of the laser and n is the index of refraction of the glass. This creates a $\pi/2$ phase shift between the etched and non-etched regions, thereby minimizing the zero-order diffraction. The fringe shift is created by moving the grating perpendicular to the lines. The motion causes a phase change of $\Delta\Phi$ in the +1 beam and $-\Delta\Phi$ in the −1 beam. When the beams interfere after the pinhole plate 136 this causes a $2\Delta\Phi$ shift of the fringe pattern.

In an embodiment, there may be three channels in the projector. The channels differ by grating line pitch and pinhole position. For example, channel 1 may have a grating pitch of 228.6 microns and the motion for the $2\pi/3$ phase shift may be 38.1 microns. Channel 2 may have a grating pitch of 200.0 microns and the motion for the $2\pi/3$ phase shift may be 33.3 microns. Channel 3 may have a grating pitch of 180.0 microns and the motion for the $2\pi/3$ phase shift may be 30.0 microns.

The grating pitch may be selected to make unwrapping relatively easier. In an embodiment, the phase unwrapping may use the Diophantine method. This requires the fringe pitch (and thus the grating pitch) to be multiples of relatively prime numbers. For example, pitch 1=8/7*pitch 2 and pitch 2=10/9*pitch 3. The relative ratios of 8:7 for channels 1 and 2 and 10:9 for channels 2 and 3 may make the unwrapping calculations relatively faster. Other methods for unwrapping phase are well known to those of ordinary skill in the art.

Not shown in FIG. 1 but typically included as part of such a 3D surface contouring system 100 is a camera that captures images of the surface 156 of the object after the surface 156 has been illuminated with the structured light grating patterns from the grating 104 and the pinholes 140, 144. Also not shown in FIG. 1 is a processor or computer that controls various parts of the system 100, including the light source, the means that moves the grating 104, and the camera. The processor or computer may also be used to perform the calculations that are part of the triangulation procedure that determines the 3D contour of the surface 156 of the object based primarily on the known physical locations of the camera and the light source with respect to the surface 156 of the object and also based on the images taken by the camera.

Figure 2:
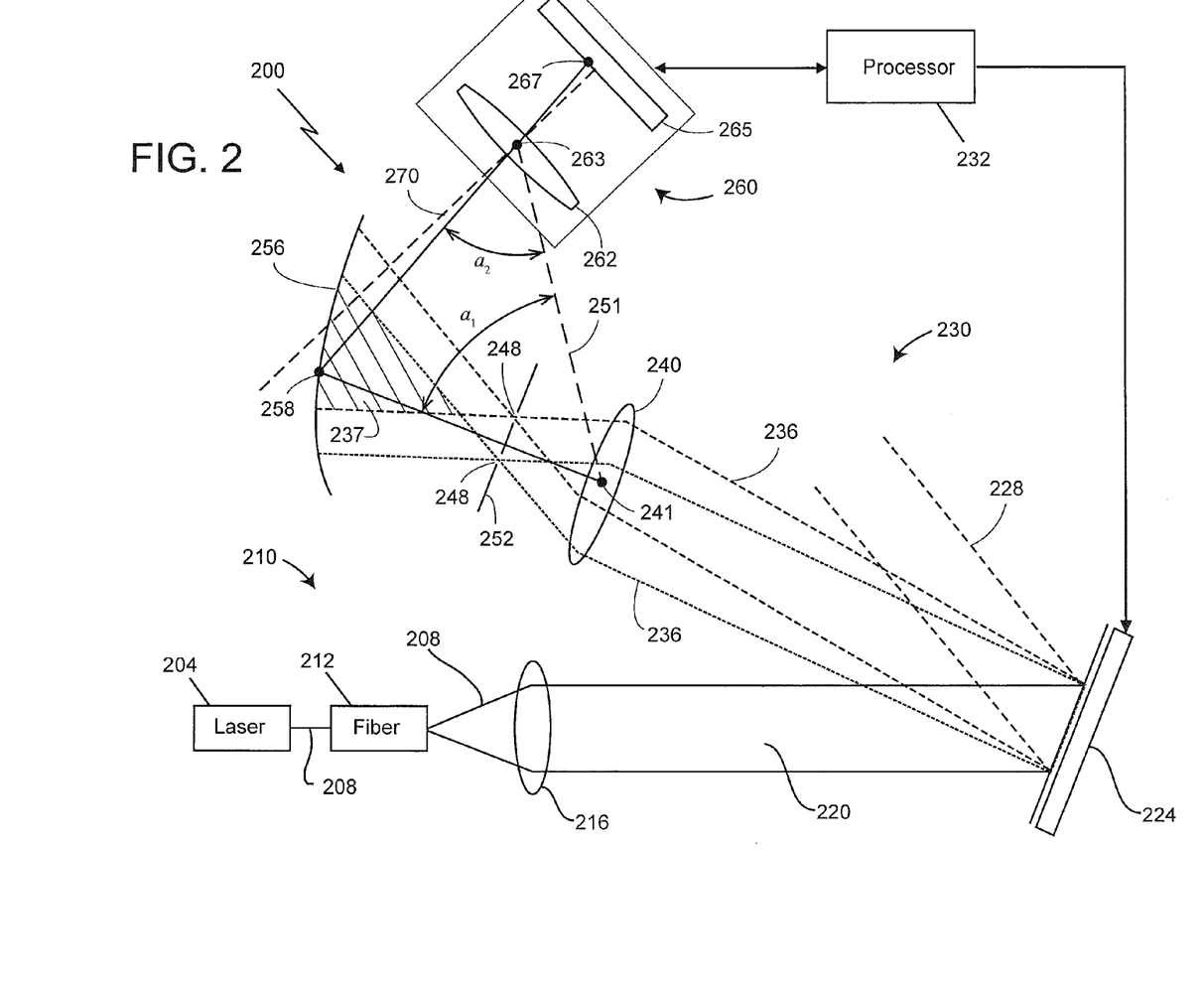
FIG. 2 illustrates a system according to embodiments of the present invention for determining the 3D surface contour of an object using a dynamic reflective diffraction grating comprising a pattern of light formed by means of a plurality of movable micromirrors. The micromirrors reflect the light through lens and a pinhole plate to form two focused spots of light corresponding to the +1 and −1 order modes of a particular grating pattern utilized, the two spots of light then interfering at the surface of the object, the interference creating a fringe pattern of sinusoidally varying irradiance. The fringe pattern may then be imaged by a camera device and processed using triangulation techniques to determine the 3D surface contour of the object.

Referring to FIG. 2, in accordance with embodiments of the present invention, there illustrated is a 3D surface contouring system 200 for accurately and rapidly measuring the 3D contour of a surface of an object. The system 200 of FIG. 2 is somewhat similar to the system 100 of FIG. 1, with the exception that in FIG. 2 a reflective digital micromirror device (DMD) is utilized as the spatial light modulator in general and as the diffraction grating in particular, instead of the transmissive diffraction grating 104 of FIG. 1. In an alternative embodiment, the reflective DMD is replaced by a transmissive DMD, the transmissive and reflective DMDs producing the same pattern of light. In another alternative embodiment, the DMD is replaced by a liquid crystal display (LCD) or liquid crystal on silicon (LCOS) display to produce the pattern of light. The LCD or LCOS display may be reflective or transmissive.

The system 200 includes a source 210, a projector 230, a camera 260, and a processor 232. In an embodiment, the source 210 includes a laser, a fiber delivery system 212, and a collimating lens 216. The projector 230 includes a spatial light modulator 224, a projector lens 240, and a pinhole plate 252. The camera includes a lens 262 and a photosensitive array 265. The processor 232 communicates with the spatial light modulator 224 and the camera 260.

The system 200 includes the laser light source 204 that provides a beam of light 208 to an optical fiber 212. Other types of light sources may be utilized. The light beam 208 travels through the optical fiber 212 and then passes to a collimator lens 216 that provides a collimated light beam 220 to a digital micromirror device (DMD) 224. The DMD 224 is an array of microelectromechanical systems (MEMS) technology mirrors that can be individually addressed using electronic (e.g., digital) words. Typically, the array comprises 800×600 or 1024×768 individually addressable digital light switching elements or "pixels." Other 2D array sizes are commercially available. One example of such a commercially available DMD 224 is a digital light processing (DLP®) microchip provided by Texas Instruments. Such a DLP® device 224 is based on MEMS technology and provides an all-digital implementation. The basic component of the DLP® device 224 is a reflective digital light switch (i.e., mirror) or pixel.

As indicated above, the DLP® device 224 may include an array having thousands of such pixels. In an embodiment, each mirror is 10-16 microns across and can rotate between two positions of ±10°, where +10° represents an "on" position at which the light beam 220 impinging on the particular mirror or pixel is reflected towards a desired object, and where −10° represents an "off" position at which the light beam 220 impinging on a particular mirror or pixel is "rejected" or directed away from the object as part of an "off beam" 228 (FIG. 2). In such a DLP® device 224, the mirrors can be individually rotated electromechanically at rates of 30 kHz or greater. The mirrors are rotated based on a digital electronic word provided by, for example, a processor 232 to the DLP® device 224. When adjusted to be in the "on" position, the mirrors or pixels that comprise the DLP® device 224 output a digital optical image towards an objective lens 240.

By selecting a suitable pattern of light on the surface of the DLP® device 224, two plane waves of light corresponding to +1, −1 orders created by the DLP® pattern can be generated. These may be sent through a lens that focuses them to two small spots of light 248. The two spots of light pass through holes in a pinhole plate. Other light is not desired and is blocked by the pinhole plate. A pinhole plate used in this way is acting as a spatial filter. The light that emerges from the pinhole plate 252 are directed towards the surface 256 of the object whose surface contour is desired to be accurately and rapidly measured. The light from the pinholes overlap in an interference region 237, indicated in FIG. 2 by hatch marks. The interference of the two light beams at the object's surface 256 creates sinusoidal variations in irradiance at the object's surface 256. The irradiance varies in alternating bright regions (sine wave peaks) and dark regions (sine wave troughs), thereby creating a fringe pattern at the object's surface.

A camera 260 is then used to capture images of the fringe patterns at the surface 256 of the object. The image data from the camera is provided to the processor 232, which controls the DLP® device 224—specifically, to control the phase of the grating patterns produced by the DLP® device 224 and ultimately the phase of the fringe patterns on the surface 256 of the object. The processor then may use known triangulation techniques to determine or calculate the 3D contour of the surface 256 of the object.

The camera device 260 includes a lens 262 and a photosensitive array 265. Light reflected or scattered off of a particular point 258 passes through all points of the lens and is focused onto a point 267 on the surface of the photosensitive array. The lens 262 has an optical axis, which is typically an axis of symmetry passing through the centers of the lens elements. There is a point in the lens 262 which is a perspective center 263. This is a point through which a ray may be drawn from the object point 258 to the array point 267. A real lens has aberrations which will make it depart slightly from the straight line path through the perspective center 263. However, measurements are carried out for each lens to characterize these aberrations and compensate for them in measurements.

A line drawn from the perspective center 241 of the projector lens 240 and the perspective center 263 of camera lens 262 is called the baseline 251, and the length of the baseline 251 is called the baseline length. The principle of the method of triangulation is to determine the lengths and angles of a triangle having vertices 263, 241, 258. The length of the baseline 251 and the values of the two angles $a_1$ and $a_2$ are used to find the length of the side from point 258 to point 263. The pixel position of the point 267 is used to determine the angles of the point 258 in relation to the optical axis 270. In this way, the coordinates of each point on the surface of the object may be determined.

Figure 3A:
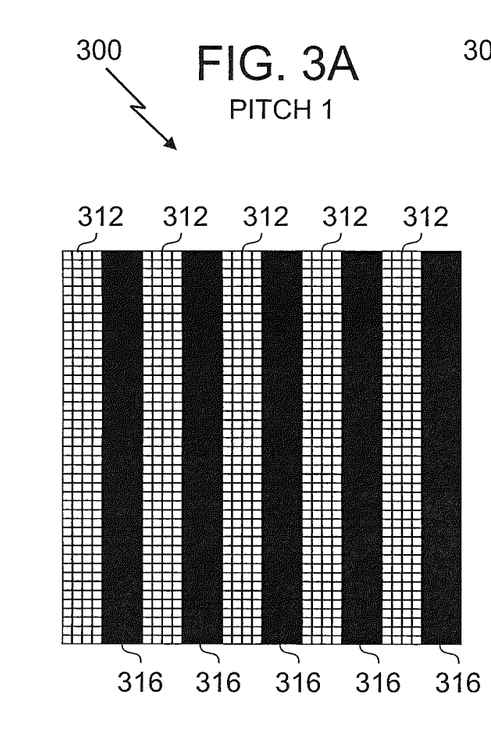
FIGS. 3A-3C, illustrates three examples of different grating patterns having different pitches and utilized within the system of FIG. 2, according to embodiments of the present invention.
Figure 3B:
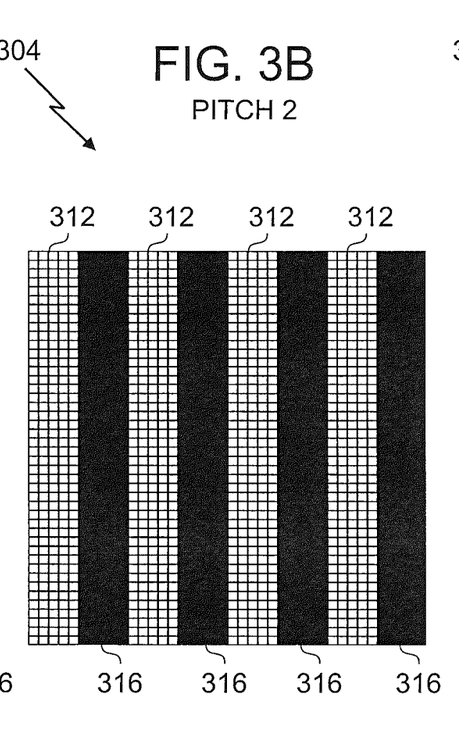
Figure 3C:
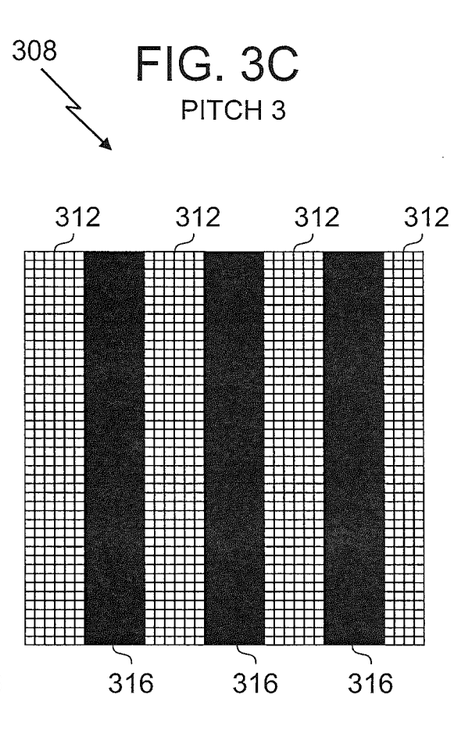

Referring to FIGS. 3A-3C, the pixels of the DMD 224 may be adjusted to produce a variety of diffraction/holographic gratings on the surface 256 of the object. In a relatively simple example, the DMD pixels may be turned on and off in columns, creating a diffraction grating. Multiple gratings 300, 304, 308 can be produced by changing the number of adjacent columns that are on or off. In FIGS. 3A-3C, columns are turned ON (white columns 312) or OFF (black columns 316). The pitch of the diffraction grating can be changed by changing the number of columns in each block. For example, Pitch 1 300 (FIG. 3A) has 5 columns on and 5 columns off. Pitch 2 304 (FIG. 3B) has 4 columns on and 4 columns off. Pitch 3 (FIG. 3C) has 3 columns on and 3 columns off.

Figure 4A:
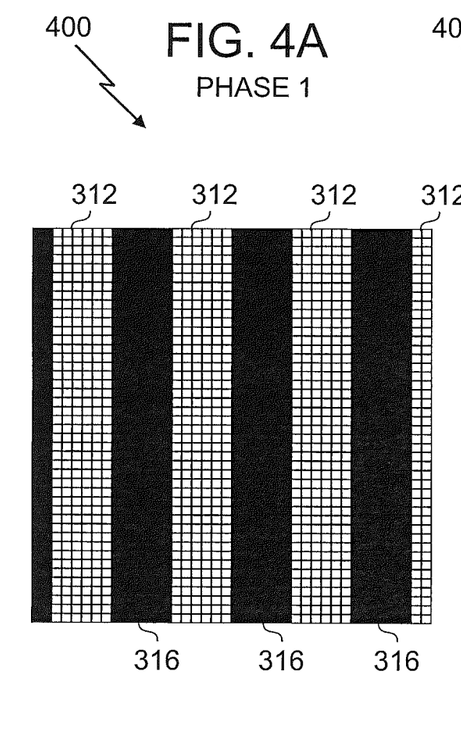
FIGS. 4A-4C, illustrates three examples of different grating patterns having different phases and utilized within the system of FIG. 2, according to embodiments of the present invention.
Figure 4B:
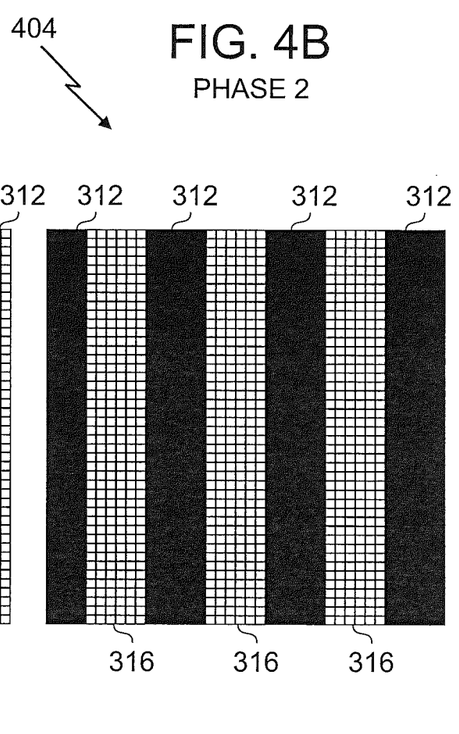
Figure 4C:
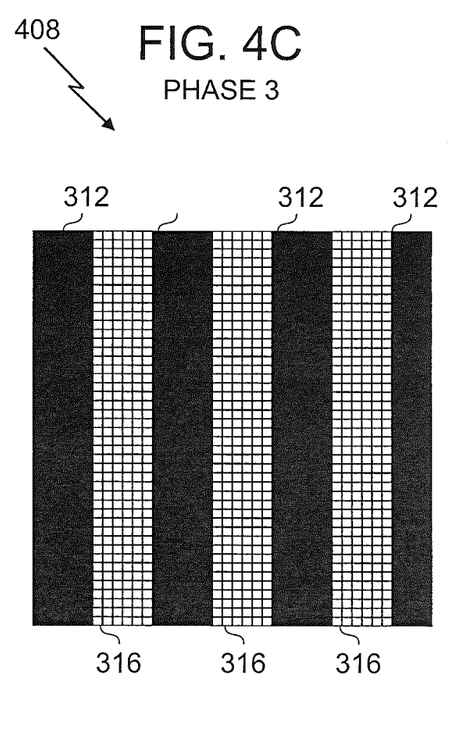

Referring to FIGS. 4A-4C, the DMD pixels can also be addressed to change the phase of the fringe pattern. In the example of the diffraction grating, the phase can be changed by shifting the pattern to the right or left. In the examples shown in FIGS. 4A-4C, the pattern of ON and OFF columns is shifted to the right starting with the pattern 400 in FIG. 4A, continuing with the pattern 404 of FIG. 4B, and ending with the pattern 408 of FIG. 4C. FIGS. 4A-4C show a two-column step for a pattern that is 12 pixels wide (6 ON, 6 OFF). This would cause a 60° phase shift for the +1 diffraction order and a −60° phase shift for the −1 diffraction order, or a 120° relative phase shift. Changes to grating pitch (FIGS. 3A-3C) or grating phase (FIGS. 4A-4C) may occur at the maximum addressable rate of the DLP® device 224 (i.e., at 30 kHz or greater).

Due to the discrete nature of the DMD array 224, the diffraction/holographic grating will become pixilated. For the diffraction grating example, the grating pitch is an even integer number of columns. This limits the possible grating pitches. The limit may affect projectors that need an integer ratio of grating pitches. There is also a limit imposed by the phase shift. If a 120° shift is desired then the pitch must be a multiple of 6 columns. If different (but known) phase shifts are acceptable then this issue disappears.

In an embodiment, grating periods are selected to be multiples of 6, 12, 18, 24, etc. These can all be shifted by $\frac{1}{6}^{th}$ of the pattern to create a 120° phase shift. In another embodiment, grating periods that are not multiples of 6 are selected, and phases are shifted to be as near as possible to one-sixth of the grating period. For example, a 13 pixel period may be shifted by 2 then 4 pixels to give phase shifts of 0°, 111°, and 222°. The wrapped phase calculation takes into account these specific phase shift values. With this embodiment, the Diophantine method can be used. For example, if the pixel spacing is 10 micrometers in the DLP® device 224, grating pitches of 23, 20, and 18 pixels may be selected to get close to 8:7 and 10:9 ratios. The phase shifts are 125° for channel 1 (4 pixel shift), 108° for channel 2 (3 pixel shift), and 120° for channel 3 (3 pixel shift).

It is also possible to use more than three phase shifts—for example, four, five, or even more phase shifts. Additional phase shifts enable other patterns to be used. For example, a grating with a period of 8 pixels may have shifts of 1, 2, and 3 pixels to produce phase shifts of 90°, 180°, and 270°.

In another embodiment, the DMD 224 can be replaced with a different type of spatial light modulator (SLM) of which the DMD 224 is one example. The SLM can be used to vary the intensity as described above for the DMD. Some types of SLMs can be used in a "phase-only" mode in which the phase, rather than the intensity, of the reflected light is varied. An SLM used in a "phase-only" mode acts as a phase grating, allowing 100% of the light to be projected onto the object to be measured rather than 50% of the light as in the case of a DMD device. A disadvantage of an SLM that is not a DMD is the relatively slow write time. The refresh rate is 10-30 Hz, compared to 30 kHz for the DMD 224.

In another embodiment, an SLM that is not the DMD type is used in transmission mode, rather than reflection mode. Examples of companies that sell non-DMD SLMs include Hamamatsu (http://sales.hamamatsu.com/en/products/solid-state-division/lcos-slm.php); Boulder (http://www.bnonlinear.com/products/index.htm); and Meadowlark (http://www.meadowlark.com/products/slmLanding.php).

In another embodiment, the light source can be strobed (flashed on and off at defined intervals). This may be necessary if the DMD or SLM needs to be refreshed. For example, if the SLM requires time to change the liquid crystal from one state to another the light source can be turned off while the SLM changes and then turned back on when it has finished. Typically SLMs require 10-100 ms to switch.

Embodiments of the present invention provide for several advantages over prior art designs such as that of FIG. 1, including the elimination of relatively expensive translation stages and repeated optics, relatively faster switching of grating pattern phase, and creation of relatively more complicated diffraction patterns to be projected onto the object whose 3D contour is to be measured.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for determining three-dimensional coordinates of a first object point on a surface of an object, the method comprising steps of:
    providing a laser source, a projector, and a camera, the projector including a spatial light modulator, a projector lens, a pinhole plate, and a processor, the spatial light modulator selected from the group consisting of a digital micromirror device, a liquid crystal display, and a liquid crystal on silicon device, the camera including a camera lens and a photosensitive array, the camera lens having an optical axis, the projector having a projector perspective center, the camera having a camera perspective center, a line segment connecting the projector perspective center and the camera perspective center being a baseline, a length of the baseline being a baseline length;
    projecting a first light from the laser source to the spatial light modulator;
    in a first instance:
        controlling with the processor the spatial light modulator to produce by the first light a first grating pattern of light having a first pitch and a first phase;
        sending the first grating pattern of light through the projector lens to form a first plurality of light spots;
        spatially filtering the first plurality of light spots with the pinhole plate to pass a first pair of light spots while blocking other light spots from among the first plurality of light spots;
        propagating light from the spatially filtered first pair of light spots to interfere at the object to obtain a first sinusoidal fringe pattern on the object, the first object point being illuminated by the first sinusoidal fringe pattern;
        imaging the first object point with the camera lens onto a first array point of the photosensitive array to obtain a first electrical data value from the photosensitive array, wherein a straight line drawn between the first array point and the camera perspective center forms a non-zero angle relative to the optical axis of the camera lens, the non-zero angle being determinable via the processor and via a location of the first array point on the photosensitive array;
    in a second instance:
        controlling with the processor the spatial light modulator to produce by the first light a second grating pattern of light having the first pitch and a second phase;
        sending the second grating pattern of light through the projector lens to form a second plurality of light spots;
        spatially filtering the second plurality of light spots with the pinhole plate to pass a second pair of light spots while blocking other light spots from among the second plurality of light spots;
        propagating light from the spatially filtered second pair of light spots to interfere at the object to obtain a second sinusoidal fringe pattern on the object, the first object point being illuminated by the second sinusoidal fringe pattern;
        imaging the first object point with the camera lens onto the first array point of the photosensitive array to obtain a second electrical data value from the photosensitive array;
    determining the three-dimensional coordinates of the first object point based at least in part on the first pitch, a spatial filter characteristic of the pinhole plate, the first phase, the second phase, the first electrical data value, the second electrical data value, the non-zero angle, and the baseline length; and
    storing the three-dimensional coordinates of the first object point.

2. The method of claim 1, further comprising steps of:
    in a third instance:
        controlling with the processor the spatial light modulator to produce by the first light a third grating pattern of light having the first pitch and a third phase;
        sending the third grating pattern of light through the projector lens to form a third plurality of light spots;

spatially filtering the third plurality of spots with the pinhole plate to pass a third pair of light spots while blocking other light spots from among the third plurality of light spots;

propagating light from the spatially filtered third pair of light spots to interfere at the object to obtain a third sinusoidal fringe pattern on the object, the first object point being illuminated by the third sinusoidal fringe pattern;

imaging the first object point with the camera lens onto the first array point of the photosensitive array to obtain a third electrical data value from the photosensitive array; and in the step of determining the three-dimensional coordinates, further determining the three-dimensional coordinates of the first object point based on the third electrical data value.

3. The method of claim 2, further including steps of:
in each of a fourth, fifth, and sixth instance:
controlling with the processor the spatial light modulator to produce by the first light a fourth, fifth, and sixth grating pattern of light having a second pitch and a fourth, fifth, and sixth phase, respectively;

imaging the fourth grating pattern of light, the fifth grating pattern of light, and the sixth modulator pattern of light, respectively, with the projector lens to obtain a fourth plurality of light spots, a fifth plurality of light spots, and a sixth plurality of light spots, respectively;

spatially filtering the fourth plurality of light spots, the fifth plurality of light spots, and the sixth plurality of light spots, respectively, with the pinhole plate to obtain a fourth pair of light spots, a fifth pair of light spots, and a sixth pair of light spots, respectively, while blocking other light spots from among the fourth plurality of light spots, the fifth plurality of light spots, and the sixth plurality of light spots, respectively;

propagating the spatially filtered fourth pair of light spots, the spatially filtered fifth pair of light spots, and the spatially filtered sixth pair of light spots, respectively, onto the object to obtain a fourth sinusoidal fringe pattern, a fifth sinusoidal fringe pattern, and a sixth sinusoidal fringe pattern, respectively, on the object, the first object point being illuminated by the fourth sinusoidal fringe pattern, the fifth sinusoidal fringe pattern, and the sixth sinusoidal fringe pattern, respectively;

imaging the first object point with the camera lens onto the first array point of the photosensitive array to obtain a fourth electrical data value, a fifth electrical data value, and a sixth electrical data value, respectively, from the photosensitive array; and in the step of determining the three-dimensional coordinates, further determining three-dimensional coordinates of the first object point based on the fourth electrical data value, the fifth electrical data value, and the sixth electrical data value.

4. The method of claim 1, wherein in the step of providing a source, a projector, and a camera, the spatial light modulator is selected to be the digital micromirror device.

5. The method of claim 1, wherein the spatial light modulator is a reflective spatial light modulator disposed and configured to reflect light from the source toward the object, and wherein:

the controlling with the processor the spatial light modulator to produce by the first light a first grating pattern of light comprises producing a first reflected grating pattern of light; and the controlling with the processor the spatial light modulator to produce by the first light a second grating pattern of light comprises producing a second reflected grating pattern of light.

6. A method for determining three-dimensional coordinates of a first object point on a surface of an object, the method comprising steps of:

providing a laser source, a projector, and a camera, the projector including a spatial light modulator, a projector lens, a pinhole plate, and a processor, the spatial light modulator comprising individually electronically addressable digital light switching elements, the camera including a camera lens and a photosensitive array, the camera lens having an optical axis, the projector having a projector perspective center, the camera having a camera perspective center, a line segment connecting the projector perspective center and the camera perspective center being a baseline, a length of the baseline being a baseline length;

projecting a first light from the laser source to the spatial light modulator;

in a first instance:
controlling with the processor the spatial light modulator to produce by the first light a first grating pattern of light having a first pitch and a first phase;

sending the first grating pattern of light through the projector lens to form a first plurality of light spots;

spatially filtering the first plurality of light spots with the pinhole plate to pass a first pair of light spots while blocking other light spots from among the first plurality of light spots;

propagating light from the spatially filtered first pair of light spots to interfere at the object to obtain a first sinusoidal fringe pattern on the object, the first object point being illuminated by the first sinusoidal fringe pattern;

imaging the first object point with the camera lens onto a first array point of the photosensitive array to obtain a first electrical data value from the photosensitive array, wherein a straight line drawn between the first array point and the camera perspective center forms a non-zero angle relative to the optical axis of the camera lens, the non-zero angle being determinable via the processor and via a location of the first array point on the photosensitive array;

in a second instance:
controlling with the processor the spatial light modulator to produce by the first light a second grating pattern of light having the first pitch and a second phase shifted relative to the first phase;

sending the second grating pattern of light through the projector lens to form a second plurality of light spots;

spatially filtering the second plurality of light spots with the pinhole plate to pass a second pair of light spots while blocking other light spots from among the second plurality of light spots;

propagating light from the spatially filtered second pair of light spots to interfere at the object to obtain a second sinusoidal fringe pattern on the object, the first object point being illuminated by the second sinusoidal fringe pattern;

imaging the first object point with the camera lens onto the first array point of the photosensitive array to obtain a second electrical data value from the photosensitive array;

determining the three-dimensional coordinates of the first object point based at least in part on the first pitch, a spatial filter characteristic of the pinhole plate, the first phase, the second phase, the first electrical data value, the second electrical data value, the non-zero angle, and the baseline length; and storing the three-dimensional coordinates of the first object point.

7. The method of claim 6, wherein the spatial light modulator is selected from the group consisting of a digital micromirror device, a liquid crystal display, and a liquid crystal on silicon device.

8. The method of claim 6, wherein the spatial light modulator is a reflective spatial light modulator disposed and configured to reflect light from the laser source toward the object, and wherein:

the controlling with the processor the spatial light modulator to produce by the first light a first grating pattern of light comprises producing a first reflected grating pattern of light; and the controlling with the processor the spatial light modulator to produce by the first light a second grating pattern of light comprises producing a second reflected grating pattern of light.

9. The method of claim 8, wherein the individually electronically addressable digital light switching elements are switchable between on and off states, and wherein:

the controlling with the processor the spatial light modulator to produce by the first light a first grating pattern of light having a first pitch and a first phase comprises switching individual ones of the individually electronically addressable digital light switching elements; and the controlling with the processor the spatial light modulator to produce by the first light a second grating pattern of light having the first pitch and a second phase shifted relative to the first phase comprises switching individual ones of the individually electronic addressable digital light switching elements.

10. The method of claim 8, wherein the spatial light modulator is selected to be a digital micromirror device comprising an array of microelectromechanical systems (MEMS) technology mirrors that are electronically individually addressable via the processor, and wherein:

the producing a first reflected grating pattern of light comprises electronically individually addressing the array of MEMS technology mirrors via the processor to produce the first reflected grating pattern of light; and the producing a second reflected grating pattern of light comprises electronically individually addressing the array of MEMS technology mirrors via the processor to produce the second reflected grating pattern of light.

11. The method of claim 10, wherein the MEMS technology mirrors are rotatable between +10 degrees and −10 degrees, and wherein:

the producing a first reflected grating pattern of light comprises rotating the MEMS technology mirrors between +10 degrees and −10 degrees; and the producing a second reflected grating pattern of light comprises rotating the MEMS technology mirrors between +10 degrees and −10 degrees.

* * * * *